Dec. 14, 1965   W. B. SEIDEL   3,222,825
MACHINE TOOL WITH WORKPIECE TRANSPORTING HEADSTOCK
Filed Sept. 26, 1963   4 Sheets-Sheet 1

INVENTOR.
WILLIAM B. SEIDEL
BY
ATTORNEYS

United States Patent Office 3,222,825
Patented Dec. 14, 1965

3,222,825
MACHINE TOOL WITH WORKPIECE TRANSPORTING HEADSTOCK
William B. Seidel, Cincinnati, Ohio, assignor to The Cincinnati Milling Machine Co., Cincinnati, Ohio, a corporation of Ohio
Filed Sept. 26, 1963, Ser. No. 311,871
13 Claims. (Cl. 51—215)

The present invention relates to a machine tool mechanism for loading, driving, and unloading workpieces, particularly suitable for grinding operations on workpieces too small to handle with conventional loading, driving, and unloading mechanism, and particularly suitable for use in a grinding operation in which the workpiece is supported in shoes in the grinding position.

In a machine tool, such as a grinding machine, designed for repetitive grinds on successive identical workpieces, the capacity of the machine tool, measured in terms of the number of finished workpieces which can be produced in a given time, depends to a significant extent on the time required, between grinds, to load and unload a workpiece. It is common to have automatic loading and unloading mechanisms which are synchronized with the feed movement of the grinding wheel, and efforts are constantly made to reduce the time required for loading and unloading workpieces to increase the capacity of the machine.

In a grinding machine, it is known to have a workpiece transferred from a source of unoperated workpieces to a loading member, from the loading member to a driving member, and from the driving member to an unloading member. Each transfer of the workpiece, however, has a tendency to increase the unproductive time between grinds, and adds to the difficulty of loading and unloading the workpiece without mishap. The difficulties of rapid loading are magnified when the workpieces are extremely small.

In the present invention, there is provided mechanism to load, drive, and unload workpieces, even very small workpieces, quickly and effectively. In brief, the headstock which rotates the workpiece for grinding moves between a source of unoperated workpieces and an operating position for transporting workpieces to the operating position with a minimum number of transfers required for each workpiece. In the preferred form of the invention, in which the workpieces are located at a grinding position by shoes precisely positioned in front of the grinding wheel for grinding, the workpieces are driven in the grinding position by a pivotally mounted headstock which, when the grind on a workpiece is completed, swings up from the shoes, with the completed workpiece, toward a magazine which holds unground workpieces. The completed workpiece is discharged as the headstock approaches the magazine and a new workpiece is picked up by the headstock at the magazine. The new workpiece is loaded onto the shoes as the headstock swings back to its grinding position at the grinding wheel.

Preferably, the headstock has two aligned, spaced apart, spindles, with faces on the inner ends. The spindles have relative axial movement therebetween and, when closed on a workpiece, engage the ends thereof to slidably grip and rotate the workpiece. With the headstock raised to the magazine, the spindles close on a workpiece and carry the workpiece to the shoes as the headstock descends. Because of the sliding grip exerted on the workpiece by the rotating spindles, the workpiece is located at the grinding position by the shoes but is driven at that position by the rotating headstock spindles. After the grind is completed, and as the headstock swings toward the magazine, the spindles separate to release the workpiece. The driving faces, which engage opposite ends of the workpiece, can effectively drive and carry very small workpieces without mishap. The gripping and releasing of the workpieces is controlled by a fixed cam cooperating with a follower in the pivotal headstock, and the headstock is swung in coordination with movement of the grinding wheel by the same motor which advances and retracts the wheelhead.

It is therefore one object of the present invention to provide an improved mechanism for loading, driving, and unloading a workpiece quickly and with minimum possibility of mishap.

It is another object of the present invention to provide an improved mechanism effective for loading very small workpieces onto shoes, driving said workpieces, and unloading the workpieces from the shoes with minimum transfer of the workpieces.

It is yet another object of the present invention to provide in a grinding machine, a headstock swingable between a workpiece magazine and workpiece supporting shoes to facilitate workpiece loading.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1:
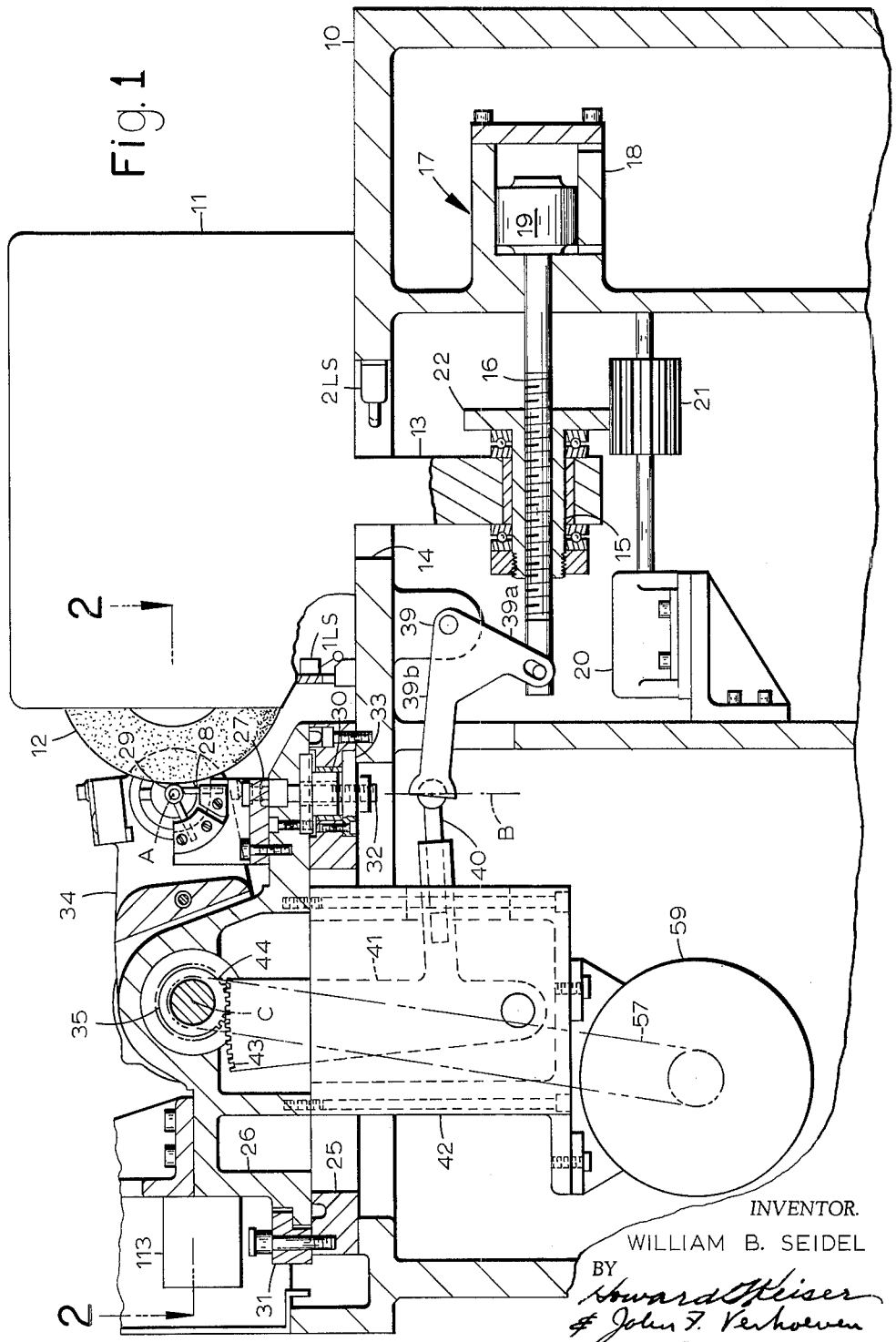
FIG. 1 is side elevation view, partly in cross-section, showing a grinding machine constructed in accordance with the present invention.

There is shown in FIG. 1 a centerless grinding machine having a base 10 on which a wheelhead 11 is slidably received. A rotatable grinding wheel 12 is mounted in the wheelhead. The wheelhead has a depending portion 13 extending through an opening 14 in the base. A nut 15 is rotatably mounted in the wheelhead portion 13, and a feed screw 16 is threadedly received in the nut. A rapid advance motor 17 comprises a cylinder 18 mounted in the base, and a piston 19, which is connected to one end of the feed screw, slidably received in the cylinder. A feed motor 20 rotates an elongated pinion 21, continuously engaged with a gear 22 of the nut, to feed the grinding wheel into the workpiece after the wheelhead has been advanced by motor 17.

The base 10 has a base plate 25 secured thereto in front of the grinding wheel on which a swivel base member, or support, 26 is received. A workpiece support 27 is secured on swivel support 26 and is held in a fixed position in front of the grinding wheel when swivel support 26 is clamped in a fixed angular position for grinding. Two angularly spaced shoes 28, secured to support 27 and narrower than the workpiece, lie in a plane F and hold a workpiece 29 on horizontal axis A for grinding in plane F. A pivot pin 30, extending from swivel support 26, is rotatably received on vertical axis B in base plate 25. The swivel support, after angular adjustment about axis B to a desired position, is clamped to base plate 25 by arcuate clamp 31 and a bolt 32 extending through the pivot pin 30 with clearance for threaded engagement with a cap 33, secured to plate 25. The axis B intersects the axis A and passes through the workpiece. Thus the workpiece will be properly positioned in front of the grinding wheel at any angular position of swivel support 26 so that tapered workpieces, as well as cylindrical workpieces, can be ground.

A headstock 34 has a sleeve 35 secured therein which is received inside spaced ball bearings 36 mounted in swivel support 26. With this construction the headstock including the sleeve 32 thereof is pivotal about the central horizontal axis C of the sleeve. The headstock has two axially aligned spindles 37 and 38, both mounted for rotation on axis D which is spaced from pivot axis C. The headstock is pivotal about axis C between an extreme lower position, shown in FIGS. 1 and 2, and an extreme raised position shown in solid lines in FIG. 4. Pivotal movement of the headstock is coordinated with the rapid advance of the wheelhead toward the workpiece supporting shoes. To accomplish this, a bellcrank lever 39 is mounted in the base and has one arm 39a pivotally connected to the shaft 16. The other arm 39b of the lever terminates in a socket on axis B which receives a ball on the end of a plunger 40 extending from arm 41. The arm 41, which is pivotally connected in a sleeve 42 secured to swivel support 26, has gear teeth 43 engaged with gear teeth 44 on headstock sleeve 35. It will be noted that since the ball and socket connection lies on axis B, the rapid advance motor 19 will be connected to the arm 41 which is carried by the swivel plate in any angular position of the swivel plate. When, at the completion of a grind, rapid advance piston 19 is retracted, arm 41 is swung clockwise (as viewed in FIG. 1) to swing the headstock counterclockwise from the lower position shown in FIG. 1 to its raised position shown in solid lines in FIG. 4.

Both spindles 37 and 38 have faces 37a and 38a, respectively, at their inner ends, normal to axis D. Spindle 37, which is mounted in bearings 50 secured in a sleeve 51 tightly received in the headstock, does not shift axially, but rotates in a position where a workpiece held against end face 37a is in registration with shoes 28. Axis D is parallel to, but spaced slightly from, axis A so that a workpiece, deposited on the shoes and held against end face 37a, will be eccentric with respect to end face 37a and will be urged into the shoes and rotated therein for grinding. Spindle 38 is mounted for rotation on axis D in ball bearings 52 which are secured in the axially shiftable inner sleeve 53 of linear ball bearing 54 secured in the headstock. Thus the spindle 38 is shiftable towards and away from spindle 37 and urges workpiece 29 against end face 37a when shifted toward spindle 37 to rotate the workpiece. Although the axial force exerted on the workpiece is sufficient to retain the workpiece between the spindle end faces, it is not great enough to prevent lateral shifting of the workpiece by engagement with the shoes. Thus, as the headstock descends into the position shown in FIG. 1, it is the shoes which locate the workpiece in the grinding position. Caps 37b and 38b are secured, respectively, on the inner ends of spindles 37 and 38 to protect the spindle bearings from grit resulting from the grinding operation.

A shaft 55 is mounted inside sleeve 35 (on axis C) by bearings 56 secured inside the sleeve. The shaft 55 is continuously rotated during operation of the machine, through belt 57 received on a pulley 58 connected to shaft 55, by a motor 59 secured on swivel plate sleeve 42. Shaft 55 has two spaced pulleys 60 and 61 which are connected, through belts 62 and 63, respectively, to pulleys 64 and 65 secured, respectively, on spindles 37 and 38. Thus spindles 37 and 38 are rotated continuously during operation of the machine.

The two spindles in the headstock define a rotatable, separable, driver for the workpiece which is operated as the headstock swings to release a workpiece at one angular position of the headstock and to grip a workpiece at another angular position thereof.

As the headstock approaches the magazine (as shown in dotted lines in FIG. 4), the spindle 38 shifts away from spindle 37 to release a workpiece. When the headstock reaches the magazine (as shown in solid lines in FIG. 4), the spindle 38 shifts toward spindle 37 to grip a workpiece from the magazine therebetween. A cam 70, having a cam face 71 at one end, is secured in the swivel support 26. The cam face 71 defines a circle having a center on axis C. A follower block 72 is pivotally received on pin 73, secured in the headstock, and has a follower arm 74 extending therefrom to engage cam face 71. The cam face 71 comprises a low section 71a, a raised section 71b, a sloping section 71c connecting one end of the raised section to the low section, and a shoulder 71d connecting the other end of the raised section to the low section. A lever 75 has one end pivotally connected by pin 76a to a block 76 which is threadedly secured on screw 77 in the headstock. The position of the block 76, although adjustable by screw 77 in accordance with the width of the workpiece, is fixed during operation of the machine. The opposite end of lever 75 is pivotally connected to a ring 78 received on bearings 79 which are held in a fixed axial relation to spindle 38. A follower rod 80 has one end pivotally connected by pin 81 to lever 75 intermediate the ends thereof. The opposite end of rod 80 engages follower block 72 between the pivot pin 73 and the cam 70. A spring 84 is received in a threaded cup 85 mounted in the headstock. The spring 84, the compression of which is adjustable by rotation of cup 85, engages rod 80 to urge lever 75 counterclockwise and follower block 72 clockwise. The lever 75 thereby urges spindle 38 toward spindle 37, and the follower arm 74 is urged against cam face 71.

Figure 2:
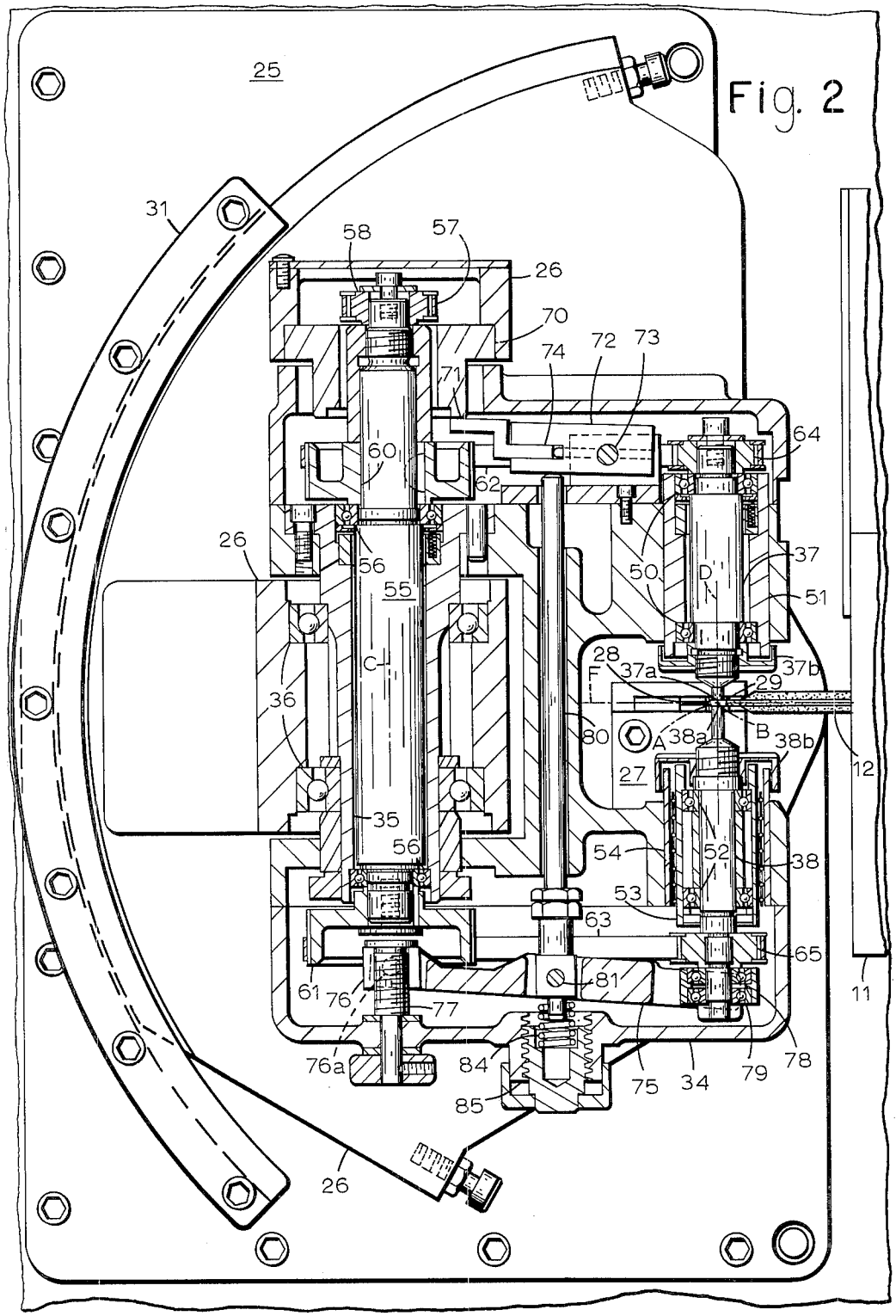
FIG. 2 is a view taken on the line 2—2 of FIG. 1.
Figure 3:
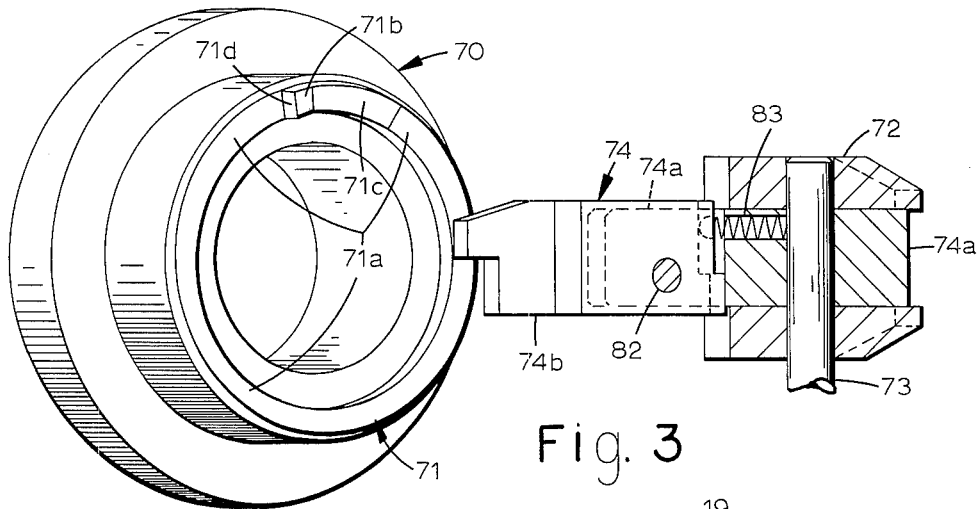
FIG. 3 is a view in perspective showing the cam which controls axial movement of one of the headstock spindles.

When the headstock is in the position shown in FIGS. 1 and 2, the follower block 72 and arm 74 are in the position shown in FIG. 3 with the arm engaged with the low face portion 71a of the cam. Thus the follower block 72 is in its extreme clockwise position as viewed in FIG. 2, the follower rod 80 is at one extreme limit of movement, lever 75 is at its extreme counterclockwise position, and spindle 38 is at its extreme inner limit of movement to hold a workpiece against end face 37a. As the headstock swings up, follower arm 74 engages cam face portion 71c, shifting rod 80 toward its other extreme limit of movement and swinging lever 75 clockwise around pin 76a, to shift spindle 38 away from spindle 37 for release of the workpiece. As the headstock reaches the magazine, the follower arm drops off the raised cam portion 71b, shifting rod 80 in the opposite direction to shift spindle 38 toward spindle 37 for gripping a workpiece received between the spindles 37 and 38. The follower arm comprises a portion 74a secured in and pivotal with follower block 72, and an outer portion 74b pivotal with respect to portion 74a about pin 82 from an extreme lower position shown in FIG. 3. As the headstock swings back to the position shown in FIGS. 1 and 2, the outer follower arm portion 74b, which is biased into its lower extreme position by spring 83, is raised by the cam against the bias of spring 83 to ride on the upper surface of cam portions 71b and 71c. When the follower arm reaches cam portion 71a, it snaps back to the position shown in FIG. 3.

Figure 4:
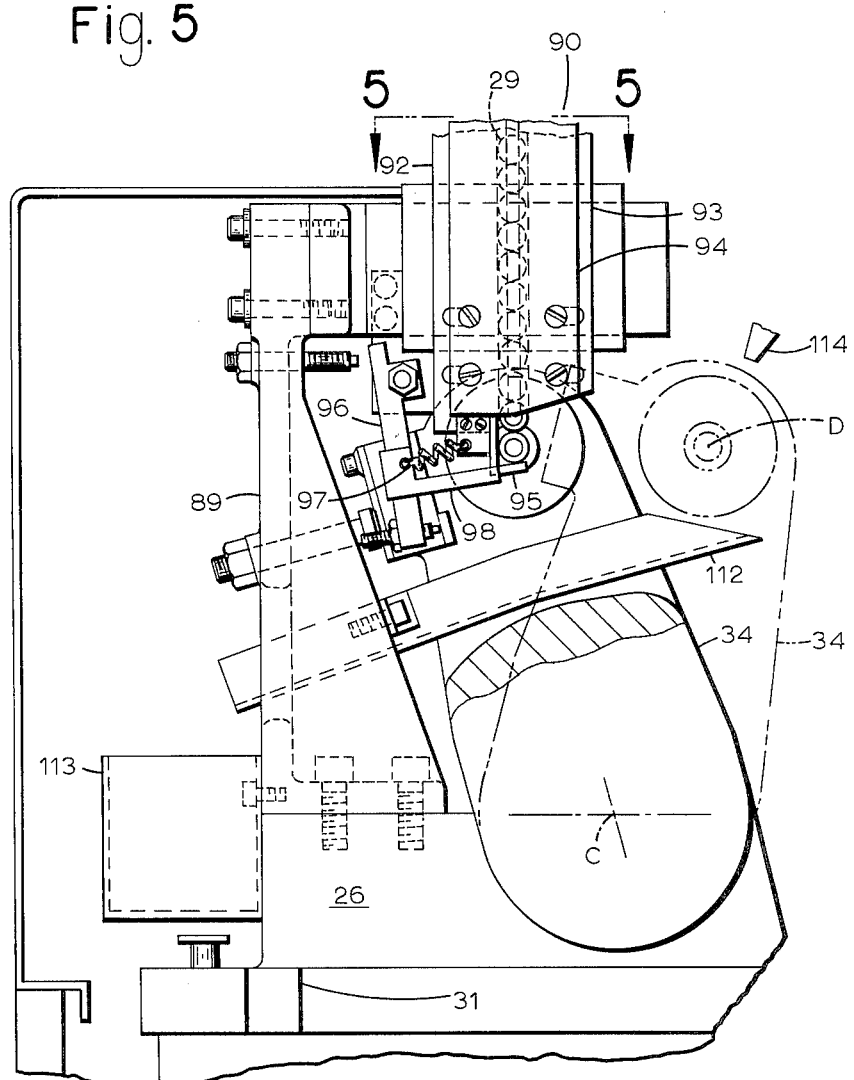
FIG. 4 is an enlarged view, taken as the view of FIG. 1, showing the workpiece magazine.

The magazine 90 for unoperated workpieces, which is mounted on bracket 89 connected to the swivel support 26, has a vertically extending backing bar 91 to which are secured two spaced apart vertically extending guide plates 92 and 93. Workpieces 29 received between the guide plates are guided therebetween by the leg of a vertically extending T bar 94. A depending hook 95, narrower than the workpiece and lying in the same plane as the support shoes 28, is connected to the side guide plate 92 away from the grinding wheel, to hold the lowermost workpiece only below the backing bar 91, T bar 94, and the other side guide plate 93. When the headstock is away from the magazine, a pivotal arm 96 is biased toward the hook by a spring 97, and two spaced side plates 98 carried by the arm straddle the hook to hold a workpiece therein. As the headstock approaches the magazine, the pivotal arm 96 is engaged by the headstock to retract the side plates (as shown in FIG. 4), exposing the ends of the workpiece to the end faces of the spindles. As the headstock completes its upward movement, the spindles snap together to grip a workpiece therebetween.

Figure 6:
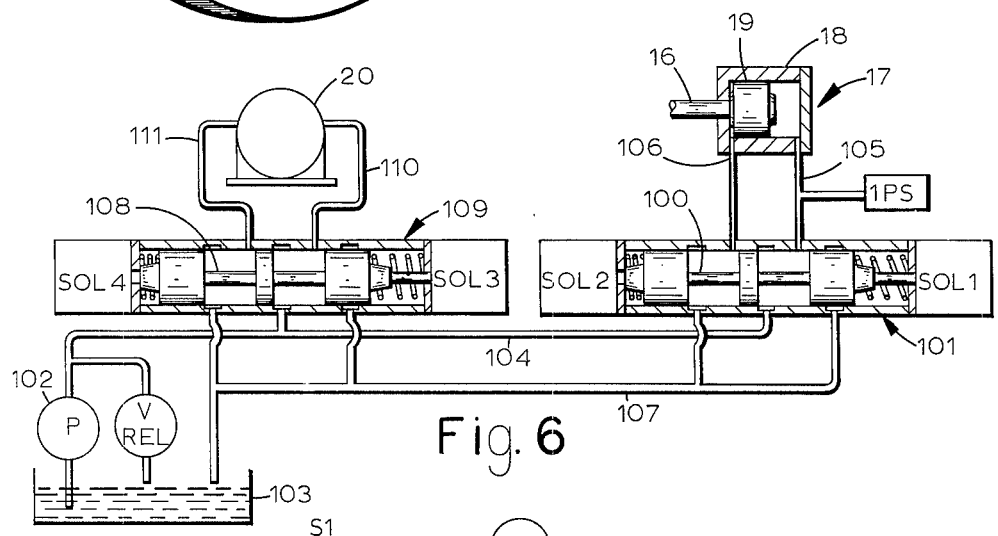
FIG. 6 is a schematic hydraulic diagram of the feed system of the grinding machine of FIG. 1.
Figure 7:
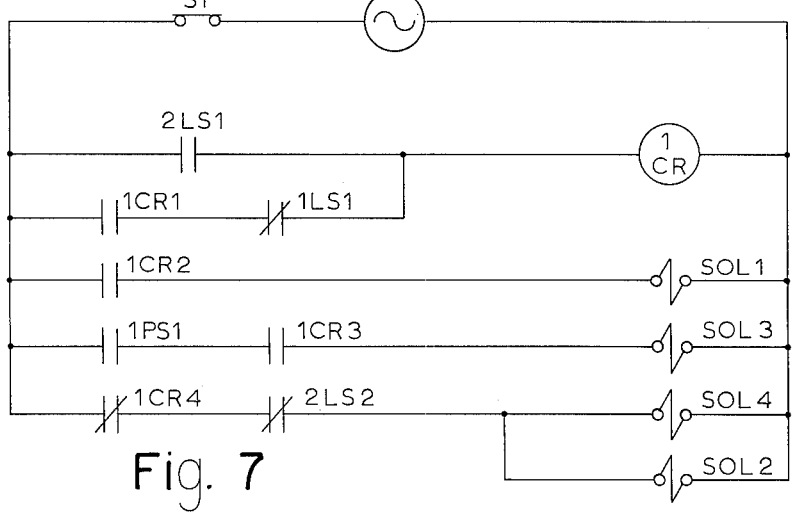
FIG. 7 is a schematic electrical diagram of the feed system of the grinding machine of FIG. 1.
Figure 5:
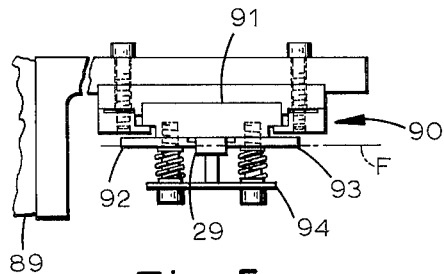
FIG. 5 is a view taken on the line 5—5 of FIG. 4.

A simple hydraulic system for the machine is shown in FIG. 6, and a simple electrical circuit for the operation of the hydraulic system is shown in FIG. 7. When the wheelhead is fully retracted, shaft 16 is fully retracted (to the right as viewed in FIG. 1) and the arm 41 is in its clockwise position to hold the headstock in its extreme upper position at the magazine, with the spindles closed to grip a workpiece on hook 95. At this time switch 2LS is operated so that the normally open contact 2LS1 thereof is closed and the normally closed contact 2LS2 thereof is open. Thus, if switch S1 is closed, relay 1CR will be energized through contact 2LS1, and the normally open contacts 1CR1, 1CR2, and 1CR3 of relay 1CR will close. Normally closed contact 1CR4 of relay 1CR will open at this time.

As contact 1CR2 closes, solenoid S1 is energized to shift valve member 100 of valve 101 to the left hand position as shown. A pump 102 delivers fluid from sump 103 to line 104 under pressure. As valve member 100 shifts to the left, pressure line 104 is connected through valve 101 to motor line 105 which is connected to cylinder 18 behind piston 19. Cylinder 18, ahead of piston 19, is connected through line 106 and valve 101 at this time to a return line 107 leading to sump 103. With motor line 105 connected to pressure, piston 19 advances to advance shaft 16. As the wheelhead advances, limit switch 2LS is released, but relay 1CR, which was sealed in through its own contact 1CR1 and normally closed contact 1LS1, remains energized.

During the rapid advance of the wheelhead produced by axial advance of shaft 16, arm 41 is moving counterclockwise, swinging the headstock 34 clockwise to the grinding position shown in FIG. 2. The workpiece, although gripped between the spindles, is slidable laterally with respect to the spindles, and, as the workpiece contacts the shoes, it is located in the proper grinding position thereby. As the headstock swings from the magazine to the grinding position, the cam 70 is ineffective because the outer follower arm portion 74b merely rides over the upper surface of cam portions 71b and 71c. Thus, a workpiece slidably gripped at the magazine, is brought down to a grinding position by the spindles and is rotated by the spindles during grinding.

When the forward movement of shaft 16 is stopped (as by contact of piston with cylinder 18), the pressure in line 105 increases to operate pressure switch 1PS and close normally open contact 1PS1. As contact 1PS closes, solenoid SOL3 is energized through contacts 1PS1 and 1CR3 to shift valve member 108 of valve 109 to the left (as shown in FIG. 6). This connects pressure to motor line 110 leading to one side of the rotary hydraulic motor 20, and connects the motor line 111 connected to the other side of the motor to return line 107 through valve 109 to effect rotation of nut 22 and advance the wheelhead at a feed rate for grinding engagement of wheel 12 with the workpiece. When the workpiece is down to size, switch 1LS is operated, opening contact 1LS1. Since switch 2LS is unoperated at this time, relay 1CR is dropped out to deenergize solenoids SOL1 and SOL3 and close normally closed contact 1CR4. As contact 1CR4 closes, solenoid SOL2 and SOL4 are energized, shifting both valve members 100 and 108 to the right, retracting the wheelhead on shaft 16 and retracting shaft 16. Retraction of shaft 16 swings arm 41 clockwise to raise the headstock. The cam is effective as the headstock moves towards the magazine to open the spindles and drop the finished workpiece into a trough 112. Finished workpieces drop from the trough into a container 113. For very small workpieces, an air nozzle 114 is mounted in the position shown in FIG. 4 to facilitate removal of the light workpieces from the headstock.

When the wheelhead is fully retracted, switch 2LS is again operated, opening contact 2LS2 to deenergize solenoids SOL2 and SOL4. As switch 2LS is operated, the cycle begins again.

With the construction disclosed above, very small workpieces (as, for example, annular races of less than .050 inch diameter for miniature bearings) can be effectively handled for rapid loading and unloading, with minimum transfer of the workpiece. The two headstock spindles, which straddle the workpiece to sandwich the workpiece therebetween, can transport and drive very small workpieces with minimum chance for mishap.

What is claimed is:
1. In a machine tool, the combination comprising
    (a) a forming tool operable to effect a forming operation on workpieces,
    (b) a magazine to hold unoperated workpieces,
    (c) a pivotal headstock having a rotatable driver selectively operable to grip and release a workpiece,
    (d) means to swing the headstock from the magazine to an operating position at the forming tool and from the operating position to the magazine to carry a workpiece to and from the operating position,
    (e) and means to render said driver effective to grip a workpiece when the headstock is at the magazine and to release a workpiece as the headstock returns from the operating position to the magazine.
2. In a grinding machine, the combination comprising
    (a) a grinding wheel movable into a workpiece at a grinding position to effect a grind thereon,
    (b) a magazine to hold unoperated workpieces,
    (c) a pivotal headstock having a rotatable driver selectively operable to grip and release a workpiece, said headstock swingable about a horizontal axis from the magazine to an operating position where a workpiece gripped by the driver is in the grinding position,
    (d) means to swing the headstock from the magazine to the operating position and from the operating position to the magazine in coordination with movement of the grinding wheel,
    (e) and means coordinated with movement of the headstock to render said driver effective to grip a workpiece at the magazine and to release a workpiece as the headstock returns from the operating position to the magazine.
3. In a grinding machine, the combination comprising
    (a) a grinding wheel,
    (b) a magazine to hold unoperated workpieces,
    (c) a headstock having a rotatable separable driver selectively operable to close for gripping a workpiece and to open for releasing a workpiece,
    (d) means to move the headstock from the magazine to an operating position at the grinding wheel and from the operating position to the magazine to carry a workpiece to and from the operating position,
    (e) and means to coordinate operation of the driver with movement of the headstock.
4. In a grinding machine, the combination comprising
    (a) a grinding wheel,
    (b) a fixed support at the grinding wheel to locate a workpiece received thereon in a grinding position,
    (c) a pivotal headstock having a pair of axially aligned rotatable spindles to define a workpiece driver, said driver operable to close for gripping a workpiece and to open for releasing a workpiece,
    (d) means to swing the pivotal headstock about a horizontal axis between the magazine and an oper- ating position where the workpiece driver rotates a workpiece gripped thereby on the fixed support, (e) and means coordinated with the movement of the pivotal headstock to open the driver during movement to the magazine for releasing a workpiece and to close the driver at the magazine to take a workpiece therefrom.

5. In a centerless grinding machine, the combination comprising
  (a) a grinding wheel movable into a workpiece at a grinding position to effect a grind thereon,
  (b) a pair of angularly spaced shoes in front of the grinding wheel to locate a workpiece deposited therein in the grinding position,
  (c) a magazine to hold unoperated workpieces,
  (d) a pivotal headstock having a rotatable driver selectively operable alternately to slidably grip and release a workpiece,
  (e) means to swing the headstock from the magazine to the shoes,
  (f) and means to render said driver effective to slidably grip a workpiece at the magazine for transport in the headstock to the shoes and to release the workpiece after the grind thereon.

6. In a grinding machine, the combination comprising
  (a) a grinding wheel movable into a workpiece at a grinding position to effect a grind thereon,
  (b) a pair of angularly spaced shoes in front of the grinding wheel to locate a workpiece deposited therein in the grinding position,
  (c) a magazine to hold unoperated workpieces,
  (d) a pivotal headstock having a pair of axially aligned rotatable spindles with adjacent end faces to receive a workpiece therebetween, said spindles operable to close for slidably gripping a workpiece and to open for releasing a workpiece,
  (e) means to swing the pivotal headstock about a horizontal axis from the magazine to the shoes and from the shoes to the magazine,
  (f) and means to close the spindles to slidably grip a workpiece when the pivotal headstock is at the magazine and to open the spindles to release a workpiece when the pivotal headstock is returning from the shoes to the magazine.

7. In a machine tool
  (a) a base member,
  (b) a cam mounted on the base member,
  (c) a headstock mounted on the base member for pivotal movement thereon, said headstock having means to grip a workpiece,
  (d) and a follower mounted in the headstock and engaged with the cam, said follower operating said workpiece gripping means in response to pivotal movement of said headstock.

8. In a machine tool
  (a) a base member,
  (b) a cam mounted on the base member and having a cam face defining a circular arc with its center on an axis,
  (c) a headstock mounted on the base member for pivotal movement thereon about said axis, said headstock having a workpiece driver operable to grip and release a workpiece,
  (d) and a follower mounted in the headstock and engaged with the cam, said follower operating said workpiece driver to grip and release a workpiece in predetermined angular positions of the headstock.

9. In a machine tool
  (a) a base member,
  (b) a cam mounted on the base member and having a cam face defining a circular arc with its center on an axis,
  (c) a headstock mounted on the base member for pivotal movement thereon about said axis, said headstock having a spindle axially shiftable to grip and release a workpiece in the headstock,
  (d) and a follower mounted in the headstock and engaged with the cam, said follower connected to said spindle to shift the spindle at predetermined angular positions of the headstock for gripping and releasing a workpiece.

10. In a machine tool
  (a) a base member,
  (b) a cam mounted on the base member,
  (c) a magazine for unoperated workpieces mounted on the base member,
  (d) a headstock mounted on the base member for movement thereon between the magazine and a grinding position, said headstock having a pair of axially aligned spindles, at least one of said spindles shiftable toward and away from the other spindle to grip and release a workpiece,
  (e) and a follower mounted in the headstock and engaged with the cam for operation thereby, said follower connected to the axially shiftable spindle to shift said spindle away from said other spindle as the headstock moves from the grinding position toward the magazine for release of a workpiece and to shift said spindle toward said other spindle as the headstock reaches the magazine to grip a workpiece.

11. In a machine tool,
  (a) a base member,
  (b) a cam mounted on the base member and having a cam face defining a circular arc with its center on an axis,
  (c) a magazine for unoperated workpieces mounted on the base member,
  (d) a headstock mounted on the base member for swinging movement thereon about said axis between the magazine and a grinding position, said headstock having a pair of axially aligned spindles, at least one of said spindles shiftable toward and away from the other spindle to grip and release a workpiece,
  (e) and a follower mounted in the headstock and engaged with the cam for operation thereby, said follower connected to the axially shiftable spindle to shift said spindle away from said other spindle as the headstock swings from the grinding position toward the magazine for release of a workpiece and to shift said spindle toward said other spindle as the headstock reaches the magazine to grip a workpiece.

12. In a machine tool,
  (a) a base member,
  (b) a pair of fixed shoes secured to the base member in a plane to receive and locate a workpiece for grinding,
  (c) a wheelhead having a grinding wheel therein movable towards and away from the shoes to grind a workpiece therein,
  (d) a cam mounted on the base member and having a cam face defining a circular arc with its center on a horizontal axis,
  (e) a magazine for unoperated workpieces mounted on the base member and operable to hold a workpiece in a ready position in the plane of the shoes,
  (f) a headstock mounted on the base member for swinging movement thereon about said axis between the magazine and the shoes, said headstock having an axially fixed rotatable spindle with an end face to hold a workpiece urged thereagainst in said plane and having an axially shiftable rotatable spindle coaxial with said axially fixed spindle,
  (g) a follower mounted in the headstock and engaged with the cam for operation thereby, said follower connected to the axially shiftable spindle to shift said spindle away from the axially fixed spindle as the headstock swings from the grinding position toward the magazine for release of a workpiece and to shift said spindle toward said other spindle as the headstock reaches the magazine to grip a workpiece, (h) and means coordinated with movement of the wheelhead to swing the headstock from the shoes to the magazine as the wheelhead retracts and to swing the headstock from the magazine to the shoes as the wheelhead advances.

13. In a machine tool for grinding a plurality of small workpieces successively at a grinding position, (a) a base member pivotal about a vertical axis extending through said grinding position, (b) means to secure said base member in a selected angular position, (c) a pair of fixed shoes secured to the base member in a plane at the grinding position to receive and locate a workpiece for grinding, (d) a wheelhead having a grinding wheel therein movable towards and away from the shoes to grind a workpiece thereon, (e) a cam mounted on the base member and having a cam face defining a circular arc with its center on a horizontal axis, (f) a magazine for unoperated workpieces mounted on the base member and operable to hold a workpiece in a ready position in the plane of the shoes, (g) a headstock mounted on the base member for swinging movement thereon about said horizontal axis between the magazine and the shoes, said headstock having an axially fixed rotatable spindle with an end face to hold a workpiece urged thereagainst in said plane and having an axially shiftable spindle coaxial with said axially fixed spindle, (h) a follower mounted in the headstock and engaged with the cam for operation thereby, said follower connected to the axially shiftable spindle to shift said spindle away from the axially fixed spindle as the headstock swings from the grinding position toward the magazine for release of a workpiece and to shift said spindle toward said other spindle as the headstock reaches the magazine to grip a workpiece, (i) and a motor connected to the headstock through a swivel joint on said vertical axis and connected to the wheelhead to swing the headstock from the shoes to the magazine as the wheelhead retracts from the shoes and to swing the headstock from the magazine to the shoes as the wheelhead advances toward the shoes.

References Cited by the Examiner

UNITED STATES PATENTS 2,849,842   9/1958   Messerschmidt _____ 51—215 X

LESTER M. SWINGLE, *Primary Examiner.*

ROBERT C. RIORDON, *Examiner.*